United States Patent
Kobayashi et al.

(10) Patent No.: US 10,754,866 B2
(45) Date of Patent: Aug. 25, 2020

(54) MANAGEMENT DEVICE AND MANAGEMENT METHOD

(71) Applicant: HITACHI, LTD., Tokyo (JP)

(72) Inventors: Emiko Kobayashi, Tokyo (JP); Mineyoshi Masuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 129 days.

(21) Appl. No.: 15/553,314

(22) PCT Filed: Apr. 30, 2015

(86) PCT No.: PCT/JP2015/062973
§ 371 (c)(1),
(2) Date: Aug. 24, 2017

(87) PCT Pub. No.: WO2016/174764
PCT Pub. Date: Nov. 3, 2016

(65) Prior Publication Data
US 2018/0046686 A1    Feb. 15, 2018

(51) Int. Cl.
*G06F 16/25* (2019.01)
*G06F 13/14* (2006.01)
(Continued)

(52) U.S. Cl.
CPC ............ *G06F 16/25* (2019.01); *G06F 3/0605* (2013.01); *G06F 3/0635* (2013.01);
(Continued)

(58) Field of Classification Search
CPC ............... G06F 16/25; G06F 17/30557; G06F 11/1076; G06F 12/0646; G06F 13/10;
(Continued)

(56) References Cited

U.S. PATENT DOCUMENTS 7,409,586 B1 *  8/2008  Bezbaruah .......... G06F 11/0727
                                                        714/13
7,711,978 B1 *  5/2010  Roy ..................... G06F 11/201
                                                        714/43
(Continued)

FOREIGN PATENT DOCUMENTS

JP    2005010956 A  *  1/2005
JP    2006-228188 A     8/2006
(Continued)

OTHER PUBLICATIONS

International Search Report for WO 2016/174764 A1, dated Jul. 21, 2015.

*Primary Examiner* — Benjamin M Thieu
(74) *Attorney, Agent, or Firm* — Volpe and Koenig, P.C.

(57) ABSTRACT

A management device managing a storage device having a plurality of logical storage areas accessed by a computer has a monitor module for determining whether a setting is made by which the computer uniformly accesses the plurality of logical storage areas, obtaining respective access counts of the plurality of logical storage areas when it is determined that the setting is made, and comparing the obtained plurality of access counts, thereby determining whether a logical storage area having a problem exists; an analysis module for obtaining, when the problem exists, configuration information of the storage device assigned to the logical storage area having the problem, and identifying a configuration in the storage device as a bottleneck on the basis of the obtained configuration information; a creation module for creating a countermeasure of changing an access route passing through the configuration as the identified bottleneck.

6 Claims, 14 Drawing Sheets

(51) Int. Cl.
- *G06F 13/10* (2006.01)
- *G06F 3/06* (2006.01)
- *H04L 29/08* (2006.01)
- *G06F 11/10* (2006.01)
- *H04L 29/14* (2006.01)
- *G06F 12/06* (2006.01)

(52) U.S. Cl.
CPC .......... *G06F 3/0653* (2013.01); *G06F 3/0689* (2013.01); *G06F 11/1076* (2013.01); *G06F 12/0646* (2013.01); *G06F 13/10* (2013.01); *G06F 13/14* (2013.01); *H04L 29/08549* (2013.01); *H04L 67/1008* (2013.01); *H04L 67/1097* (2013.01); *H04L 69/40* (2013.01); *G06F 2201/81* (2013.01)

(58) Field of Classification Search
CPC ...... G06F 13/14; G06F 3/0605; G06F 3/0635; G06F 3/0653; G06F 3/0689; G06F 2201/81; H04L 29/08549; H04L 67/1008; H04L 67/1097; H04L 69/40
See application file for complete search history.

(56) References Cited

U.S. PATENT DOCUMENTS

| | | | | |
|---|---|---|---|---|
| 8,200,817 B2 * | 6/2012 | Kusama | ................... | G06F 9/50 709/224 |
| 8,738,972 B1 * | 5/2014 | Bakman | ............... | G06F 11/0712 714/47.1 |
| 2001/0050915 A1 * | 12/2001 | O'Hare | ................. | G06F 3/0605 370/400 |
| 2002/0016792 A1 * | 2/2002 | Ito | ......... | G06F 3/0601 |
| 2002/0040411 A1 * | 4/2002 | Iwatani | ................. | G06F 3/0613 710/2 |
| 2002/0163882 A1 * | 11/2002 | Bornstein | ............... | H04L 29/06 370/227 |
| 2005/0267929 A1 | 12/2005 | Kitamura | | |
| 2006/0074948 A1 * | 4/2006 | Motoki | ............ | G06F 11/3409 |
| 2007/0055797 A1 * | 3/2007 | Shimozono | ......... | G06F 11/2005 710/36 |
| 2007/0061446 A1 | 3/2007 | Matsuo et al. | | |
| 2008/0147878 A1 * | 6/2008 | Kottomtharayil | ... | H04L 67/1097 709/235 |
| 2008/0270851 A1 | 10/2008 | Ochi et al. | | |
| 2009/0307597 A1 * | 12/2009 | Bakman | ................. | G06F 11/008 715/736 |
| 2011/0153725 A1 * | 6/2011 | Edwards | ............ | H04L 67/1097 709/203 |
| 2013/0279339 A1 * | 10/2013 | Ibuki | ....................... | H04L 47/12 370/236 |
| 2014/0215077 A1 * | 7/2014 | Soudan | ................... | H04L 47/11 709/226 |
| 2015/0121001 A1 | 4/2015 | Muroyama | | |
| 2016/0147823 A1 * | 5/2016 | Noll | .................... | G06F 16/2272 707/694 |

FOREIGN PATENT DOCUMENTS

| | | |
|---|---|---|
| JP | 2008-276279 A1 | 11/2008 |
| JP | 4686305 B2 | 2/2011 |
| JP | 2015-082315 A | 4/2015 |
| JP | 2016208243 A * | 12/2016 |

* cited by examiner

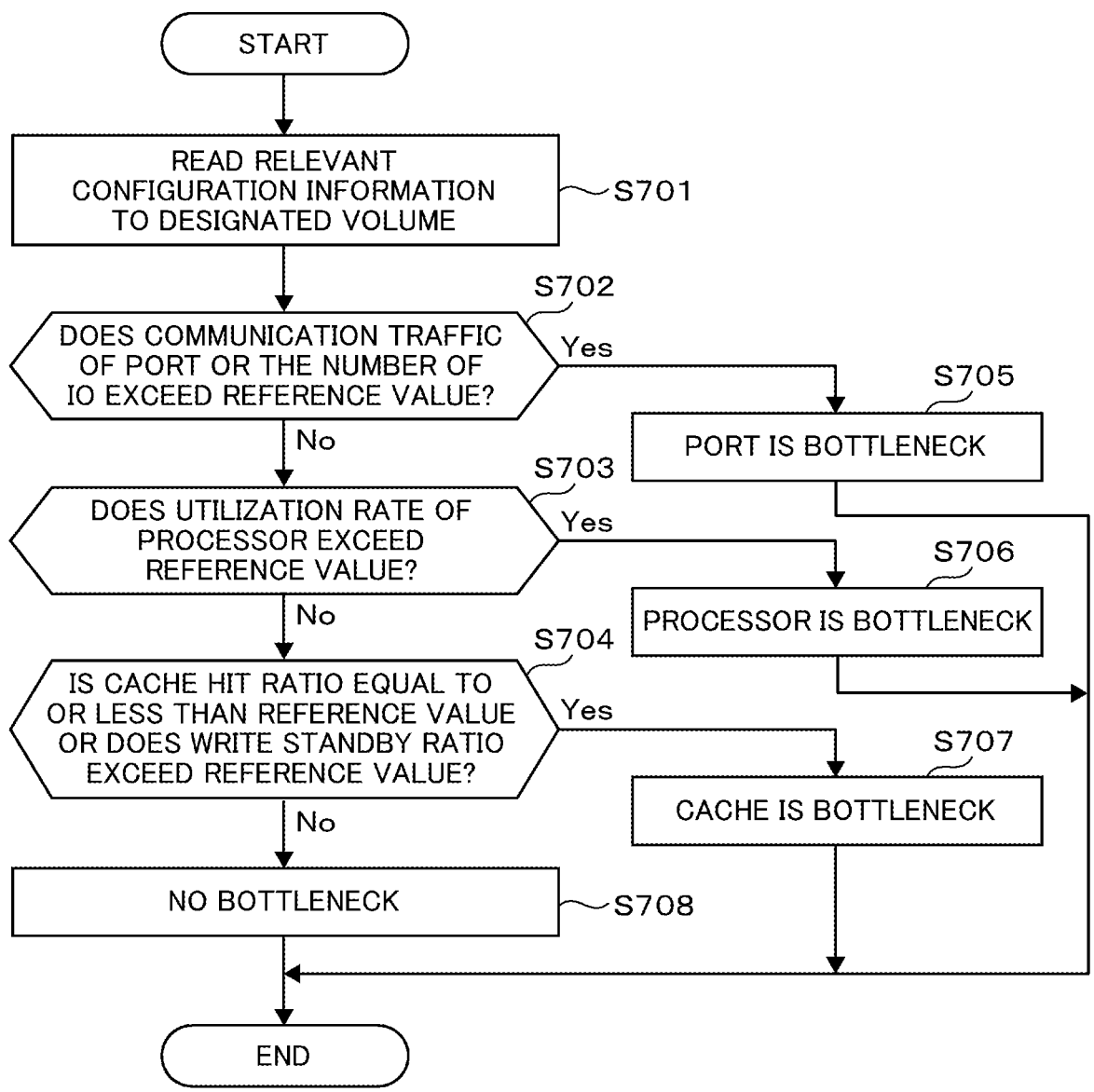
F I G. 7

| Tablespace ID | STORAGE AREA GROUP ID | CAPACITY | VOLUME ID | BACKUP DESTINATION | REQUIRED PERFORMANCE (IO NUMBER [/s]) |
|---|---|---|---|---|---|
| User Table 1 | 1 | 450GB | #1,#2,#3 | null | 200 OR MORE |
| User Table 2 | 2 | 500GB | #4,#5 | null | 200 OR MORE |
| Log | 3 | 100GB | #6 | host1:/dev/01 | 300 OR MORE |
| Archive | 4 | 1TB | #7 | host1:/dev/02 | 50 OR MORE |

1101 1102 1103 1104 1105 1106

F I G. 1 2

| VOLUME ID | CAPACITY | PROCESSOR ID | PORT ID | PARITY GROUP ID | CACHE ID |
|---|---|---|---|---|---|
| #1 | 100GB | #1 | #1 | #10 | #1 |
| #2 | 200GB | #1 | #2 | #10 | #1 |
| #3 | 150GB | #2 | #2 | #30 | #2 |
| #4 | 100GB | #3 | #2 | #20 | #3 |

1201      1202       1203       1204       1205       1206

F I G. 1 3 A

| VOLUME ID | AVERAGE IO NUMBER [/s] | AVERAGE IO AMOUNT [KB/s] | AVERAGE RESPONSE TIME[ms] | PROCESSOR UTILIZATION RATE[%] | ACCESS TENDENCY |
|---|---|---|---|---|---|
| #1 | 100 | 400 | 5 | 30 | RANDOM READ |
| #2 | 200 | 800 | 3 | 20 | RANDOM READ |
| #3 | 210 | 850 | 1 | 10 | RANDOM WRITE |

1301      1302       1303       1304       1305       1306

F I G. 1 3 B

| PROCESSOR ID (1311) | UTILIZATION RATE (1312) |
|---|---|
| #1 | 50 |
| #2 | 35 |
| #3 | 30 |

F I G. 1 3 C

| PORT ID (1321) | COMMUNICATION TRAFFIC (1322) | IO NUMBER (1323) |
|---|---|---|
| #1 | 200 | 100 |
| #2 | 300 | 120 |
| #3 | 400 | 200 |

F I G. 1 3 D

| CACHE ID (1331) | WRITE STANDBY RATE (1332) |
|---|---|
| #1 | 35 |
| #2 | 5 |
| #3 | 10 |

| Tablespace ID | AVERAGE IO NUMBER [/s] | AVERAGE IO AMOUNT [KB/s] | AVERAGE RESPONSE TIME [ms] |
|---|---|---|---|
| User Table 1 | 150 | 400 | 5 |
| User Table 2 | 200 | 800 | 3 |
| Log | 350 | 850 | 1 |
| Archive | 150 | 500 | 2 |

MANAGEMENT DEVICE AND MANAGEMENT METHOD

TECHNICAL FIELD

The present invention relates to a management device and a management method.

BACKGROUND ART

Some middleware and application programs executed in a database management system, an application server, or the like manage data arrangement in a storage apparatus so that data can be safely and quickly accessed. For example, data is distributed to a plurality of storage devices, and IO (Input/Output: for example, read/write commands or accesses) are evenly distributed to enhance parallel execution degrees of the multiple storage devices to increase a speed.

On the other hand, even in the storage apparatus, likewise, data management for improving high-speed performance such as hierarchical management in which the storage devices are logically formed and recognized by the application program and placed in the storage devices different in performance depending on the access frequency to data is executed.

Patent Literature 1 discloses a technique for allocating IO paths to the storage apparatuses and the application server according to an importance and a use time band of an application program.

CITATION LIST

Patent Literature

Patent Literature 1: Japanese Patent No. 4686305

SUMMARY OF INVENTION

Technical Problem

With the use of the technique disclosed in Patent Literature 1, the IO paths can be allocated corresponding to the application program. However, the IO is evenly distributed to the application program whereas there is no guarantee that the storage apparatuses that logically form the storage devices will evenly perform the processing. When a bottleneck occurs in the storage apparatus, not only part of the equally distributed IO is delayed but also processing based on the evenly distributed IO is delayed as a whole due to a part of the delay.

Further, it is difficult for an administrator on the application side to determine which part of the storage apparatus is a bottleneck and cannot be processed evenly, and it takes a lot of labor to determine the part.

In view of the above, the present invention aims at providing countermeasure proposals to remove a bottleneck to an administrator when a performance problem attributable to the bottleneck of a part of a storage apparatus occurs.

Solution to Problem

A typical management device according to the present invention is directed to a management device that manages a storage apparatus having a plurality of logical storage areas accessed from a computer, including: a monitoring module that determines whether there is a setting that the computer equally accesses the plurality of logical storage areas, acquires the number of accesses to each of the plurality of logical storage areas if it is determined that there is the setting that the computer equally accesses, and determines whether there is a problematic logical storage area by comparing the acquired plural number of accesses with each other; an analysis module that acquires component information of the storage apparatus allocated to the problematic logical storage area if it is determined that there is the problematic logical storage area, and identifies which of components in the storage apparatus is a bottleneck based on the acquired component information; a creation module that creates a countermeasure proposal that changes an access route passing through a configuration as the identified bottleneck; and an output module that outputs the created countermeasure proposal.

Advantageous Effects of Invention

According to the present invention, even if a performance problem caused by the bottleneck as a part of the storage apparatus arises, the countermeasure proposal to remove the bottleneck can be provided to the administrator.

BRIEF DESCRIPTION OF DRAWINGS

FIG. 7 A flowchart illustrating an example of a bottleneck analysis process.

FIG. 12 A diagram illustrating an example of a storage configuration information management table.

FIG. 13A A diagram illustrating an example of a storage performance information management table relating to volumes.

FIG. 13B A diagram illustrating an example of a storage performance information management table relating to processors.

FIG. 13C A diagram illustrating an example of a storage performance information management table relating to ports.

FIG. 13D A diagram illustrating an example of a storage performance information management table relating to caches.

DESCRIPTION OF EMBODIMENTS

First Embodiment

Figure 1:
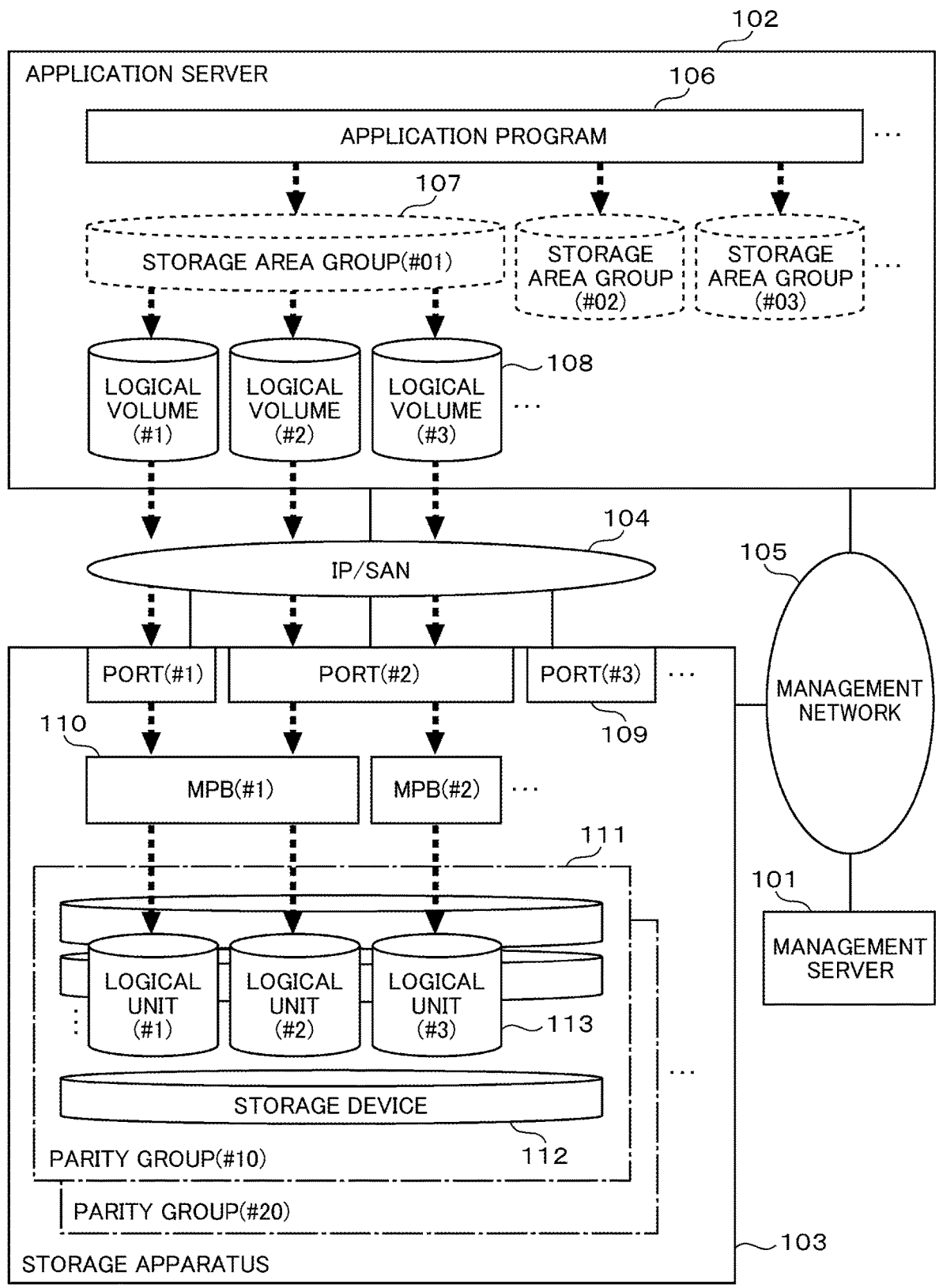
FIG. 1 A diagram illustrating an example of configuration of a system.

FIG. 1 is a diagram illustrating an example of a configuration of a system. The system of this example includes a management server 101 that manages a storage apparatus 103, an application server 102 that executes an application program 106, and the storage apparatus 103 that stores data of the application program 106. The application server 102 and the storage apparatus 103 are connected to each other through a storage area network (SAN) 104 such as an IP (Internet Protocol) or a fiber channel. In addition, the application server 102 and the storage apparatus 103 are connected to the management server 101 through a management network 105.

The storage apparatus 103 collectively manages a plurality of physical storage devices 112 by RAID (Redundant Arrays of Inexpensive Disks), and forms parity groups 111. In the parity groups 111, logical units 113 in which a storage area is logically formed is set so as to be disposed across the plurality of physical storage devices 112. The logical units 113 may also be referred to as logical devices or the like. The logical units 113 are a group of storage areas designated at the time of read/write from the application server 102, and are recognized as logical volumes (hereinafter simply referred to as volumes) 108 from the application program 106.

In the example of FIG. 1, "#1" and the like of the logical units (#1) are IDs (identifiers) for individually identifying the plurality of logical units 113, and the same is applied to notations of components other than the logical units 113. Further, in this example, since the volumes 108 correspond to the logical units 113 one-to-one, the logical units 113 may be replaced with the volumes 108.

The storage apparatus 103 includes ports 109 that communicate with the application server 102 with connection to the storage area network 104 for enabling reading and writing from the application server 102. The storage apparatus 103 also includes MPBs (microprocessor blades) 110 that manage the partition groups 111 and the logical units 113, and converts communication by the ports 109 into reading and writing respect to the storage devices 112. A plurality of microprocessors are mounted on the MPBs 110. A configuration of the storage apparatus 103 will be further described below.

The application server 102 is a general server, that is, a general computer, and executes the application program 106. The application program 106 manages one or more volumes 108 as a group with storage area groups 107. The storage area groups 107 are configured by, for example, the volumes 108 having similar characteristics (performance). For that reason, the application program 106 can selectively use the respective storage area groups 107 according to the performance required for data in application processing. It should be noted that the application program 106 may be a middleware or a database program.

The application program 106 accesses the volumes 108 through the storage area groups 107 when data is read from or written to the storage apparatus 103 during the execution of the application program 106. Since the volumes 108 are logical volumes and are not substantive, the application server 102 sets the access to the volumes 108 as the access to the storage apparatus 103 through the storage area network 104. The access is received by the storage apparatus 103 at the ports 109, and the MPBs 110 convert the access into access to the logical units 113 in the parity groups 111 configured by the storage device 112 which is substantive. Paths of the access are indicated by dotted arrows in FIG. 1.

When a large number of volumes 108 are present, a large amount of hardware resources are required to allocate the physical ports 109 and the MPBs 110 to the respective volumes 108. Therefore, as illustrated in FIG. 1, one port 103 or one MPB 110 may be allocated to the plurality of volumes 108. In the example of FIG. 1, two volumes 108 are allocated to #2 of the port 109, and two logical units 113 are allocated to #1 of the MPB 110. Those allocations affect the loads (performances) of the respective components.

The storage area network 104 is intended for communicating data read/written by the application program 106 whereas the management network 105 is intended for communicating management information. The management server 101 receives performance information and the like from the application server 102 and the storage apparatus 103 through the management network 105, and sets information for the application server 102 and the storage apparatus 103.

Figure 2:
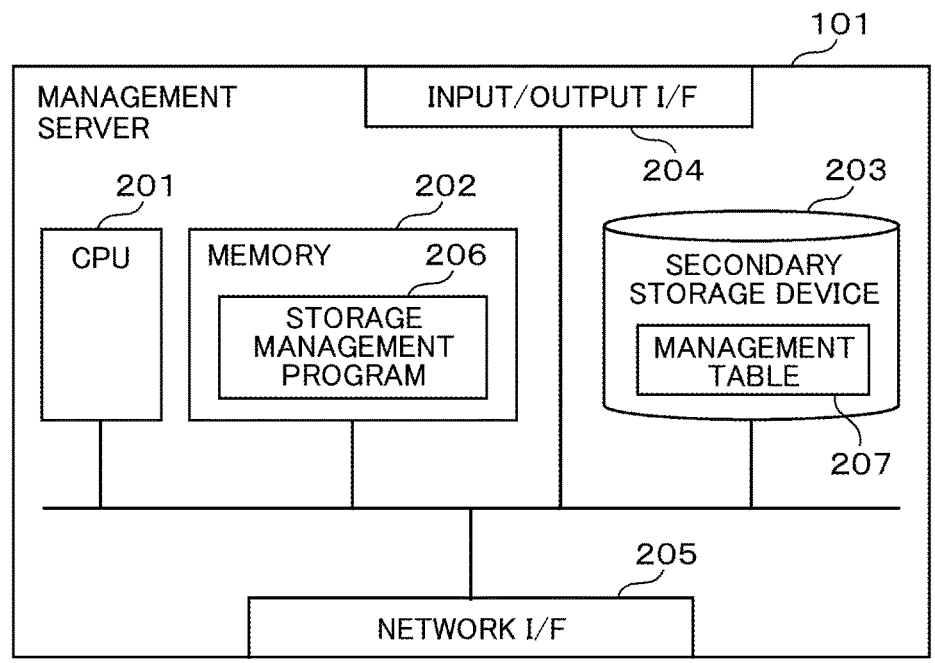
FIG. 2 A diagram illustrating an example of a configuration of a management server.

FIG. 2 is a diagram illustrating an example of the configuration of the management server 101. The hardware of the management server 101 includes at least one CPU (central processing unit) 201, a memory 202, a secondary storage device 203 such as a hard disk, an input/output I/F (interface) 204 that controls information on inputs from a keyboard and a mouse, and an output to a display, and a network I/F 205 that is connected to the network. The same is applied to the hardware configuration of the application server 102.

A storage management program 206 is loaded on a memory 202 of the management server 101 and executed by the CPU 201. Data of the management table 207 used by the storage management program 206 is stored in the secondary storage device 203. In the application server 102, the application program 106 is loaded on the memory and executed by the CPU. Each server may be implemented not as a physical machine but as a virtual machine.

Figure 3:
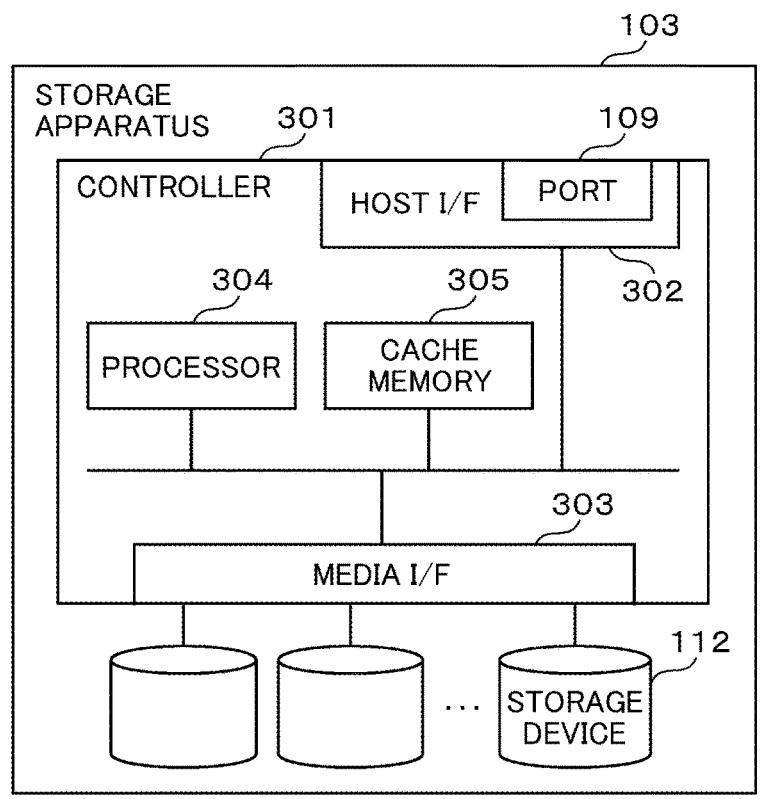
FIG. 3 A diagram illustrating an example of a configuration of a storage apparatus.

FIG. 3 is a diagram illustrating an example of a hardware configuration of the storage apparatus 103. The controller 301 includes a host I/F 302 as a connection interface with a host computer such as the application server 102 on a front end side, a media I/F 303 as a connection interface with the storage medium on a back end side, at least one processor 304, and a cache memory 305 described above, which are interconnected to each other through an internal network.

A storage device 112 such as a hard disk is connected as a storage medium. The processor 304 sets up logical storage areas (parity groups 111) configured by plural sets of the same type of storage media (storage devices 112). The respective parity groups 111 may have different characteristics. The characteristics are, for example, a difference in storage elements of the storage device 112, a difference in interface, and a difference in a RAID level, and the performance is different depending on those differences. For that reason, the set parity group 111 is managed together with its characteristics, and managed, for example, with three stages of high, middle and low as a performance level.

The host I/F 302 has a port 109. The storage apparatus 103 may include one or more host I/F 302, and one host I/F 302 may have one or more ports 109. The processor 304 forms the MPB 110, the storage apparatus 103 may include one or more MPBs 110, and one MPB 110 may include one or more processors 304.

Figure 4:
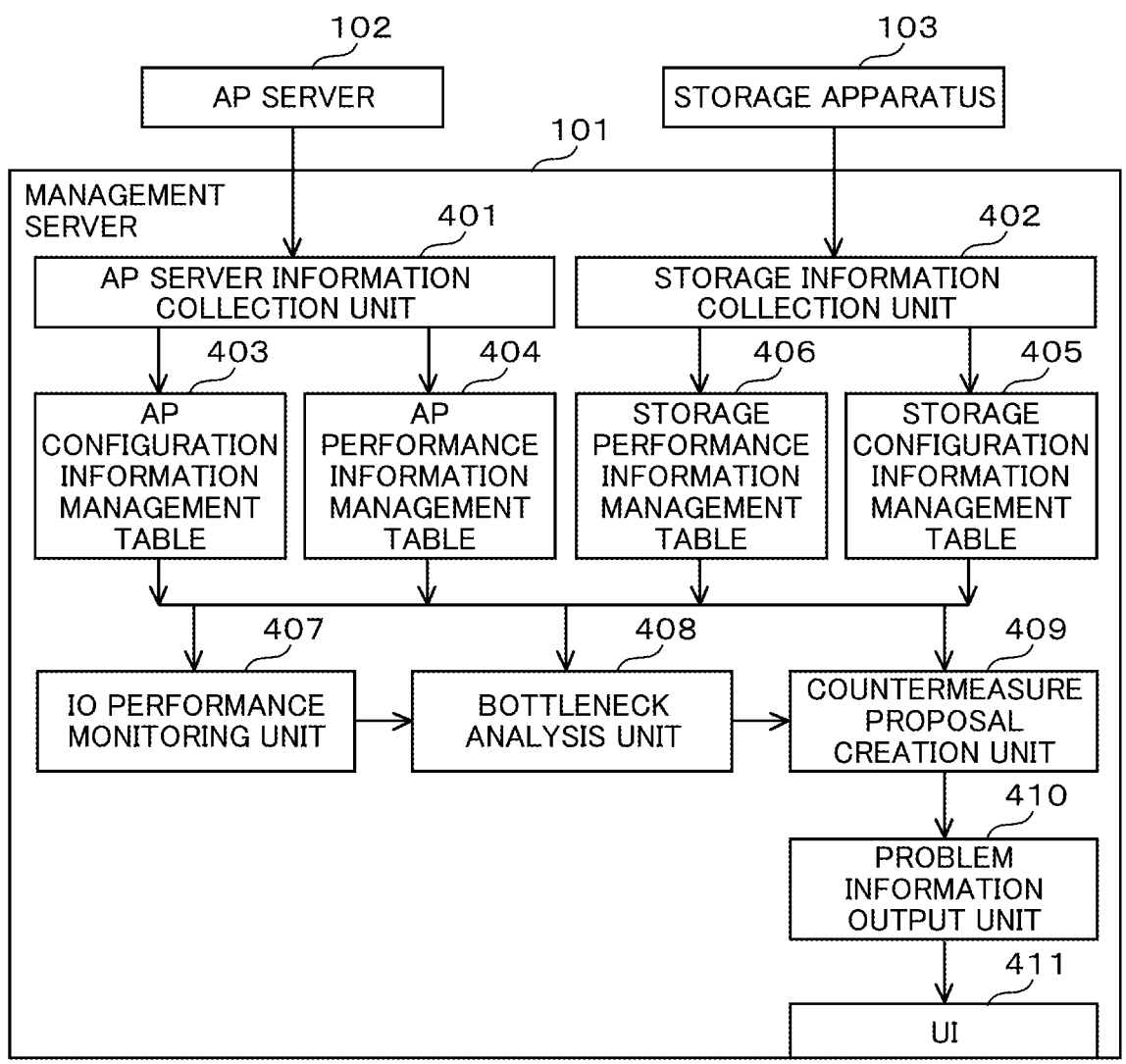
FIG. 4 A diagram illustrating an example of a configuration of a processing module of a management server.

FIG. 4 is a diagram illustrating an example of a configuration of a processing module of the management server 101. The management server 101 includes an AP server information collecting unit 401 that collects configuration information and performance information from the AP server (application server) 102, a storage information collecting unit 402 that collects configuration information and performance information of the storage apparatus 103, an IO performance monitoring unit 407 that monitors the IO performances such as the number of disk IO and an IO response time, a bottleneck analysis unit 408 that analyzes the IO performance when there is a problem, a countermeasure proposal creation unit 409 that creates a countermeasure proposal to remove the bottleneck, a problem information output unit 410 that outputs information related to the countermeasure, and a UI (user interface) 411.

Those units (the respective modules) may be realized by allowing the CPU 201 to execute the storage management program 206. For example, in a state where the CPU 201 is executing the AP server information collection portion (program module) in the storage management program 206, the CPU 201 and the memory 202 may be regarded as the AP server information collection unit 401 (hardware module). For that reason, a description with the respective components as subjects below may be replaced by a description with the CPU 201 as the subject.

Further, as a table for managing the collected configuration information and performance information, the management server 101 holds an AP configuration information management table 403, an AP performance information monitoring table 404, a storage configuration information management table 405, and a storage performance information management table 406. Those tables may be included in the management table 207 of the secondary storage device 203.

Figure 5:
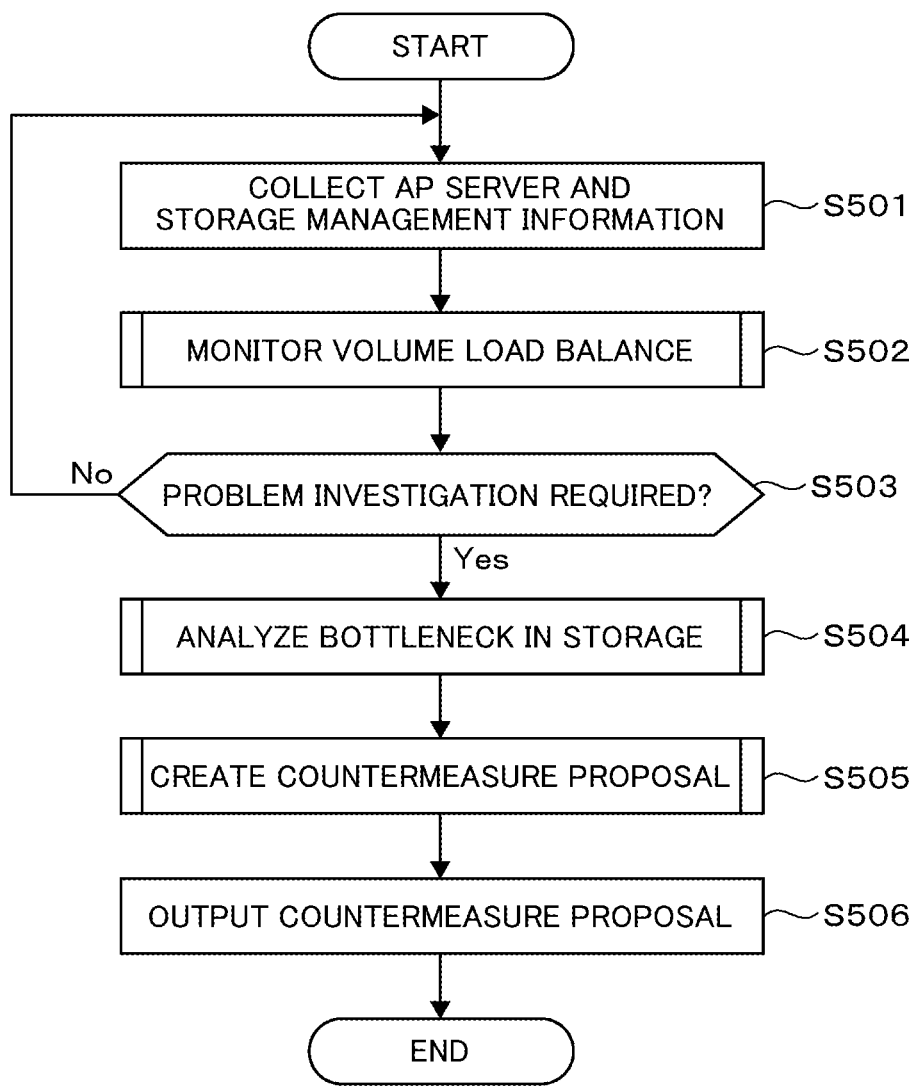
FIG. 5 A flowchart illustrating an example of an entire process.

FIG. 5 is a flowchart illustrating an example of entire processing. Each of the AP server information collection unit 401 and the storage information collection unit 402 periodically collects configuration information and performance information of the application server 102 and the storage apparatus 103 (S501). Collection intervals of the configuration information and the performance information are different from each other. The AP server information collecting unit 401 and the storage information collecting unit 402 periodically collect the configuration information and irregularly collect the configuration information at the time of a configuration change, whereas the AP server information collecting unit 401 and the storage information collecting unit 402 collect the performance information at minute intervals.

The performance information collected in this example is the number of times of read and write, the amount of read and write, and a response time with respect to the storage apparatus 103 on the side of the application server 102. The collected performance information is the number of times of read and write, the amount of data, and the response time with respect to the volumes 108 (logical units 113) on the side of the storage apparatus 103.

With respect to the performance information to be collected next, the IO performance monitoring unit 407 monitors whether the number of IO for each of the volumes 108 is deviated (S502). The bottleneck analysis unit 408 determines whether there is a problem based on the monitoring result (S503). If there is a problem, the bottleneck analysis unit 408 analyzes the bottleneck (S504). When there is the bottleneck in the storage, the countermeasure proposal creation unit 409 creates a countermeasure proposal for eliminating the bottleneck (S505). Then, the problem information output unit 410 and the UI 411 output the problem information (S506). Where a countermeasure is implemented, it may be confirmed whether the problem, has been improved by returning to the collection (S501) or monitoring (S502).

Figure 6:
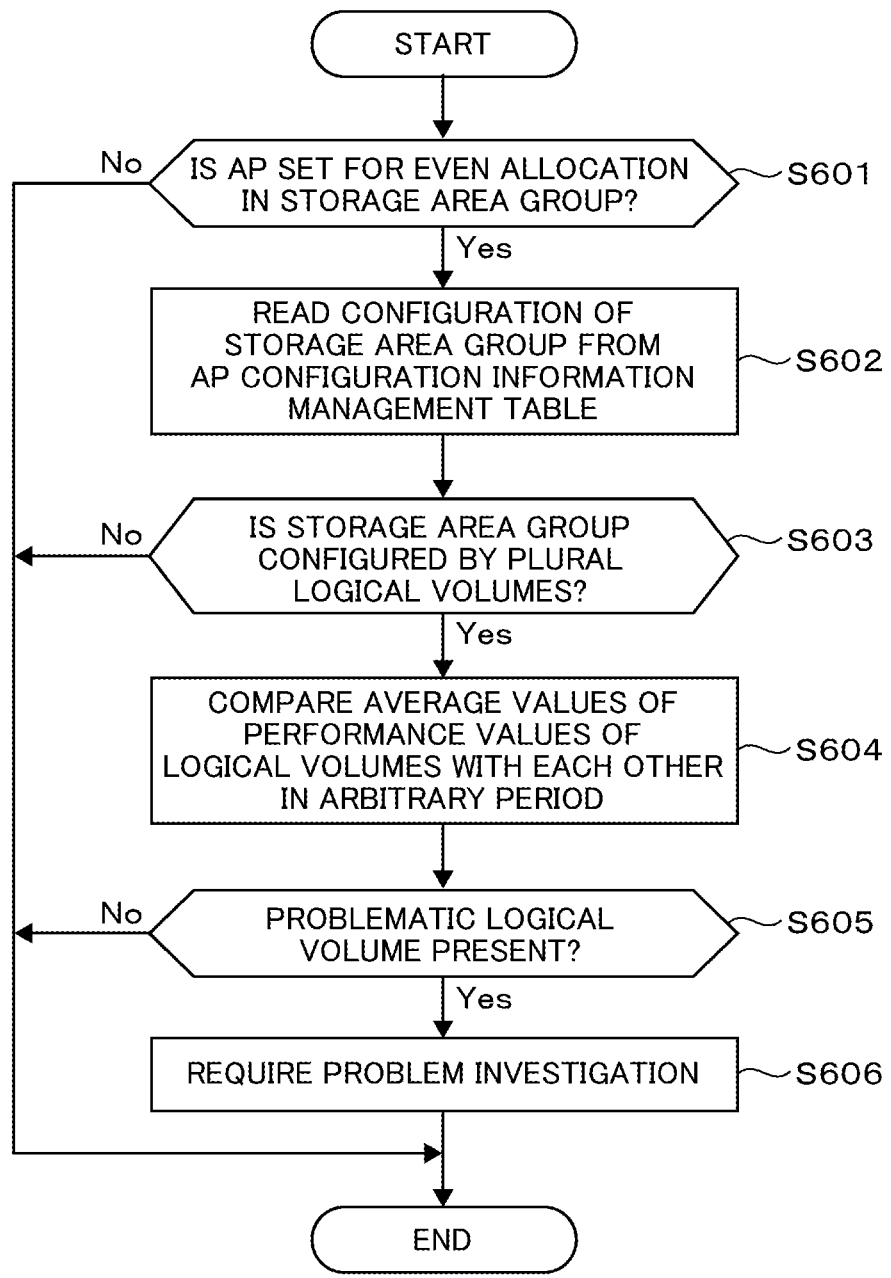
FIG. 6 A flowchart illustrating an example of an IO monitoring process.

FIG. 6 is a flowchart illustrating an example of an IO monitoring process for each of the volumes 108. This process corresponds to Step S502 illustrated in FIG. 5. The IO performance monitoring unit 407 is managed by the storage area group 107 in the application server 102, and determines whether even allocation is set (S601). If it is determined that the result of this determination is not set, the processing after Step S602 is not executed. The management by the storage area group 107 is set in the AP configuration information management table 403 which will be described later with reference to FIG. 11, and the even allocation may be set in advance by an application administrator or the like. Further, the even allocation may be set based on information output by the application program 106 or information for identifying what the application program 106 is.

If it is determined that the determination result in Step S601 is set, the IO performance monitoring unit 407 acquires the volume information configuring the storage area group 107 from the AP configuration information management table 403 (S602). The IO The performance monitoring unit 407 determines whether the storage area group 107 is configured by the plurality of volumes 108 (S603). When the storage area group 107 is configured by the plurality of volumes 108, the IO performance monitoring unit 407 acquires the performances of the respective volumes 108 from the storage performance information management table 406, and compares average values of the performance of the respective volumes 108 over an arbitrary period with each other (S604).

In this example, the number of IO and the response time are compared as the performance value, respectively. The management server 101 may calculate a median value and a mode value in addition to the average values of the respective volumes 108 in an arbitrary period, based on history data of at least one collected performance value. Which one of those values is used is set in advance as a system or appropriately set by an application administrator.

As an example, a case of the number of IO will be described. As a comparison condition, the IO performance monitoring unit 407 determines whether there is the volume 108 whose IO number is larger than the others, or the volume 108 whose IO number is smaller than the other is present (S605). In the setting using the median value, the median value of the IO numbers of the respective volumes 108 is calculated, and when the degree of deviation from the median value is equal to or larger than a reference value, it is determined that the condition is met. In this example, the reference value is set in advance as a system, or set by the application administrator.

For example, when three volumes 108 belong to a storage area group, the number of IO per second is volume is a volume #1: 100/second, a volume #2: 200/second, and a volume #3: 210/second, and a criterion of the degree of deviation of the median value including others from 200/second is set to 10%, 100/sec of the volume #1 is less than others and it is determined that there is a problem. If any volume meets the set conditions, the volume 108 that meets the condition needs to be subjected to a problem investigation, and the process is completed (S606).

When the average value is used as the comparison condition, the IO performance monitoring unit 407 calculates the standard deviation, and if there is the volume 108 whose standard deviation is equal to or smaller than the reference value and does not fall within the average value plus or minus standard deviation, it may be determined that the volume meets the condition. Also, similar determination may be made using dispersion. In this example, the reference value is also preset.

The same is applied to a case of the response time, and an average value of the response times in an arbitrary period is calculated for each of the volumes 108 periodically acquired. The average value of the response times for each of the volumes 108 is compared with each other, and it is discriminated whether there are some of the volumes 108 whose response times are slower than others. Regarding the response time, even if the criterion of deviation degree or the criterion of the standard deviation falls outside the reference value, there is no problem if the time is short. Only when the response time is long outside the reference value, it is determined that there is a problem and the problem investigation is required (S606).

FIG. 7 is a flowchart illustrating an example of a bottleneck analysis process in the storage apparatus 103. This process corresponds to Step S504 illustrated in FIG. 5. For the volume 108 determined to be problematic in Steps S502 and S503, the bottleneck analysis unit 408 reads relevant configuration information from the storage configuration information management table 405 (S701). Also, the bottleneck analysis unit 408 reads the performance of a relevant port 109, the performance of the processor 304, and the performance of the cache memory 305 from the storage performance information management table 406.

The bottleneck analysis unit 408 compares each of the read performance values with a reference value to determine whether each performance value exceeds the reference value. As comparison between each of the performance values and the reference value, one or more measured values (performance values) collected during a given period are each compared with the reference value, and a case where the measured values exceed the reference value for more than a given number of times may be determined as being exceeded. Alternatively, an average value or a median value may be calculated as a representative value of the measured values and compared with a reference value or the like.

In the flowchart, it is determined whether communication traffic or the IO number of the ports 109 exceeds a reference value (S702). If the communication traffic or the IO number exceeds the reference value, the port 109 identifies the communication traffic or the IO number as the bottleneck and completes the processing (S705). Next, it is determined whether the utilization rate of the processor 304 exceeds a reference value (S703). If the utilization rate exceeds the reference value, the processor 304 specifies the bottleneck and completes the processing (S706).

Further, it is determined whether a cache hit ratio or a write standby rate falls outside a reference value range (S704), If the cache hit ratio or the write standby rate falls outside the reference value, the cache memory 305 identifies the cache hit ratio or the write standby rate as the bottleneck and completes the processing (S707). If none of the above values falls outside the reference values, the bottleneck analysis unit 408 completes the processing with no bottleneck (S708). Steps S702 to S704 of the comparison processing with the reference values may be performed in an order different from the order illustrated in FIG. 7.

Figure 8:
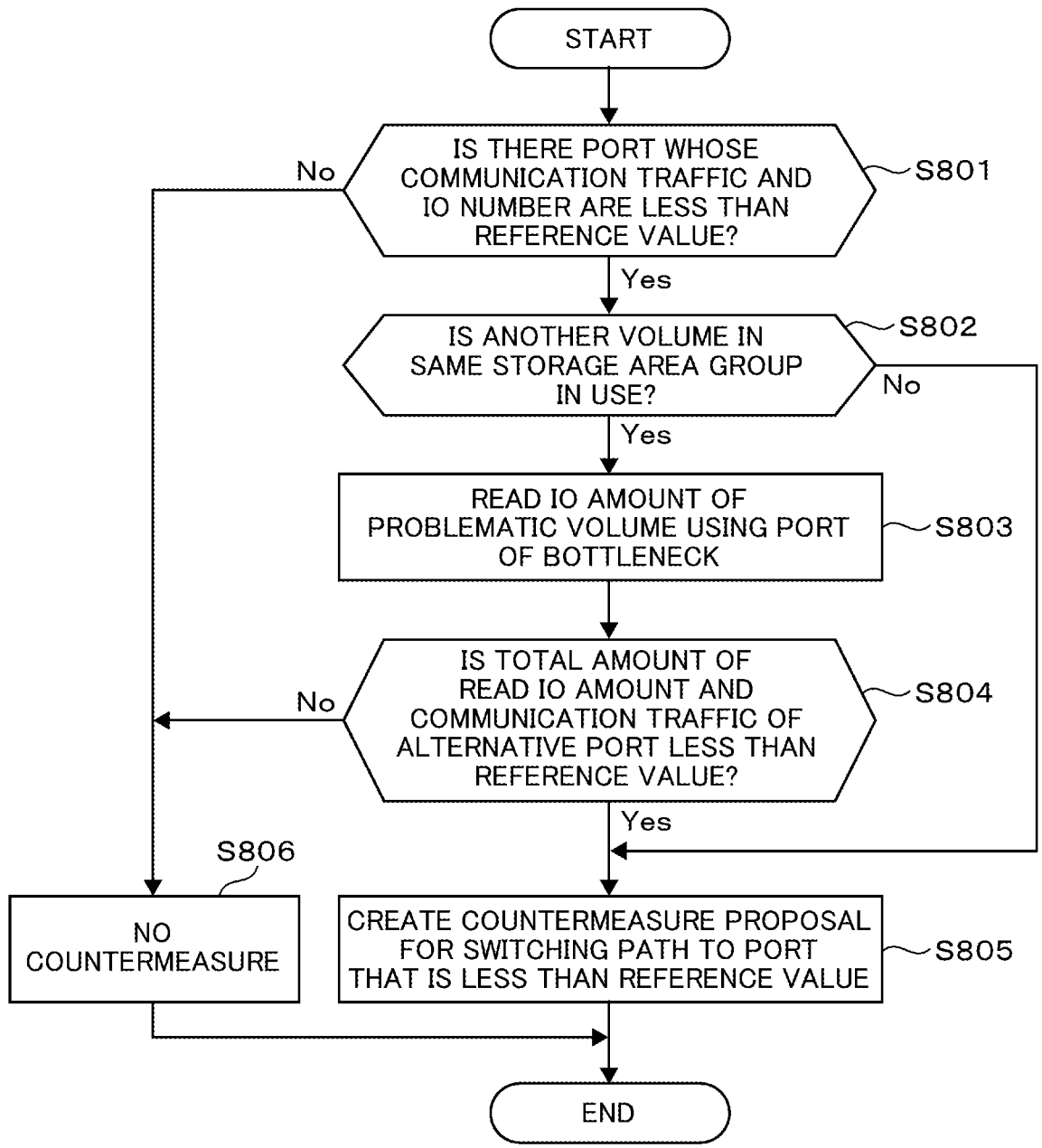
FIG. 8 A flowchart illustrating an example of countermeasure proposal creating process to remove a port bottleneck.
Figure 9:
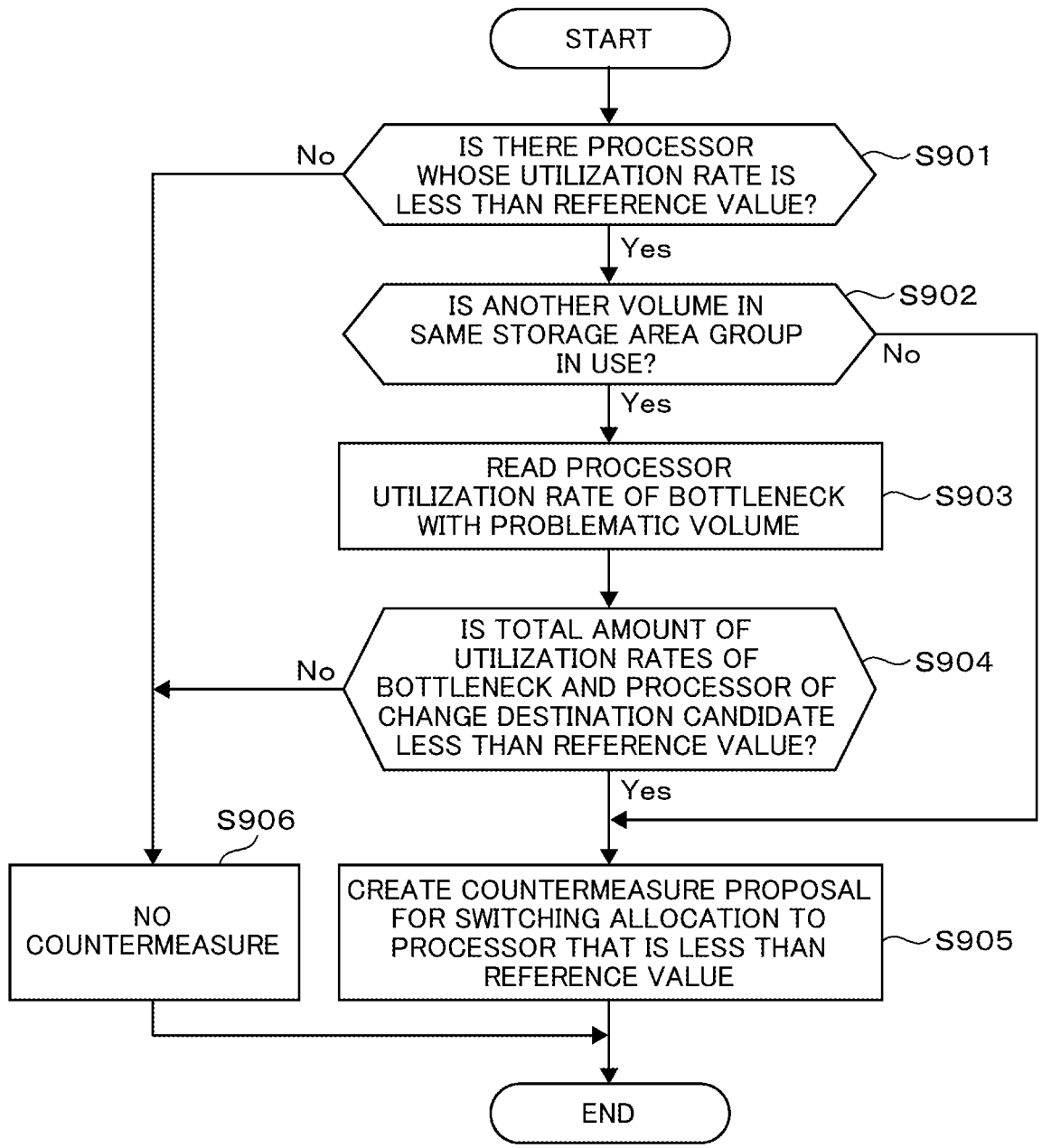
FIG. 9 A flowchart illustrating an example of a countermeasure proposal creating process to remove a processor bottleneck.
Figures 10, 11:
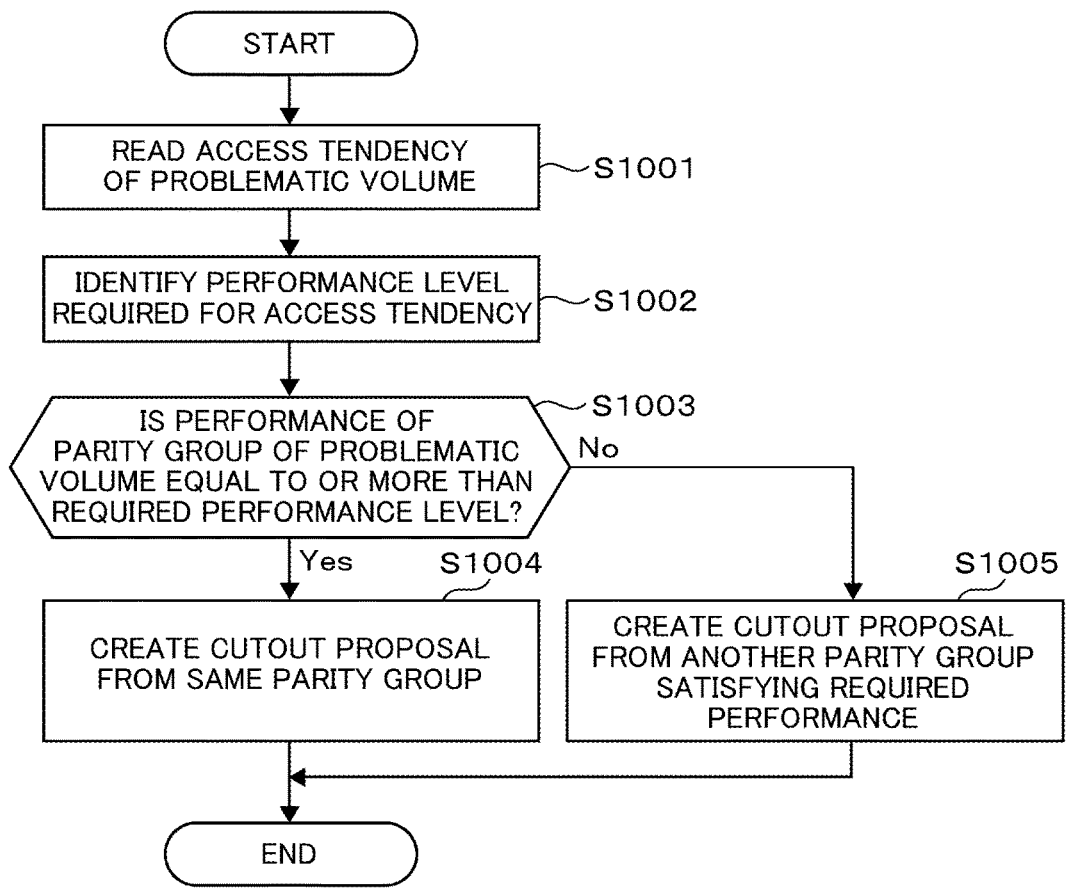
FIG. 10 A flowchart illustrating an example of an additional volume cutout proposal creating process.
FIG. 11 A diagram illustrating an example of an AP configuration information management table.

FIGS. 8 to 10 are flowcharts illustrating examples of a countermeasure proposal creation process. When any part is identified as the bottleneck, a proposal to change the part of the bottleneck in use to another part is created in this example. A description will be given of each type of bottlenecks identified in the process illustrated in FIG. 7 with reference to the flowchart.

FIG. 8 is a flowchart illustrating an example of a countermeasure proposal creation process when the port 109 is the bottleneck. In order to search for an alternative port of the port 109 which is the bottleneck, the countermeasure proposal creation unit 409 first refers to the port management information of the storage performance information management table 406, and determines whether there is the port 109 whose communication traffic and IO number for a given period is less than a reference value (S801). The reference value in this example may be the same as the reference value used for the bottleneck analysis or may be a reference value stricter (lower) than the former.

When there is a port 109 that is less than the reference value, it is determined whether another volume 108 in the storage area group 107 including the problematic volume using the port 109 as the bottleneck is a port 109 to be used with reference to the AP configuration information management table 403 (S802). This is because if the port 109 used by the volume 108 of the same storage area group 107 is taken as an alternative port, there is a possibility that the port in question affects the volume 108 that has already used the alternative port, and affects the performance as the storage area group 107.

When the port 109 that is less than the reference value is a port 109 that is not used by the volume 108 of the same storage area group 107, the countermeasure proposal creation unit 409 creates a description for changing the port 109 used for accessing the problematic volume from the port 103 which has been the bottleneck to the port 109 that is less than the reference value as a countermeasure proposal (S805). It is assumed that the description in this example is described in various languages such as output character strings and scripts.

When there are a plurality of candidate ports 109 that are less than the reference value, the countermeasure proposal creation unit 409 may take each of the candidate ports 109 as a countermeasure proposal, and give priority to the countermeasure proposals so as to increase the priority of the ports 109 low in the current communication traffic and the current number of IO. Further, the countermeasure proposal creation unit 409 may calculate a predicted value when changing from the communication traffic and the amount of IO of the current port 109, and confirm whether the calculated predicted value is less than the reference value. When the predicted value exceeds the reference value, the port 109 whose predicted value exceeds the reference value may be deleted from the countermeasure proposal.

If the port 109 less than the reference value is a port 109 being used by the other volume 108 of the same storage area group 107 in Step S802, the countermeasure proposal creation unit 409 searches for the port 109 that is less than the reference value again (not shown). If there is no port 109 whose reference value is less than the reference value other than the port 109 being used by the other volume 108 of the same storage area group 107, it is confirmed whether the communication traffic exceeds the reference value even when switching to the alternative port. For that reason, the countermeasure proposal creation unit 409 refers to the storage performance information management table 406 and reads the IO amount of the problematic volume using the port 109 of the bottleneck (S803).

The countermeasure proposal creation unit 409 calculates average communication traffic of the alternative port for a given period, and sums the calculated average communication traffic and the amount of IO read in Step S803. The countermeasure proposal creation unit 409 determines whether the total amount is less than a reference value (S804). If the determination result in Step S804 is less than the reference value, the countermeasure proposal creation unit 409 creates a description to change to the port 109 that is less than the reference value as a countermeasure proposal (S805). When there is no port 109 that is less than the reference value in Step S804, the countermeasure proposal creation unit 409 completes the processing with "no countermeasure" (S806). In addition, if there is no corresponding port 109 in Step S801, it is meant that the load is high on any port 109, and the processing is completed with "no countermeasure" (S806).

FIG. 9 is a flowchart illustrating an example of a countermeasure proposal creation process when the processor 304 is the bottleneck. As with the case where the port 109 becomes the bottleneck, the countermeasure proposal creation unit 409 creates an allocation change proposal of the processor 304 with reference to the performance information. First, the countermeasure proposal creation unit 409 determines whether there is the processor 304 whose utilization rate in a given period is less them a reference value with reference to the processor management information of the storage performance information management table 406 (S901).

If there is the processor 304 that is less than the reference value, the countermeasure proposal creation unit 409 refers to the AP configuration information management table 403, and confirms whether the processor 304 that is less than the reference value is a processor 304 to which the other volume 108 of the storage area group 107 including the volume 108 allocated to the processor 304 of the bottleneck is allocated (S902). If there is not such a processor, the countermeasure proposal creation unit 409 creates a description for changing the allocation of the volume 108 from a bottleneck processor 304 to the processor 304 less than the reference value as a countermeasure proposal (S905).

In the case where there are a plurality of candidate processors 304 that are less than the reference value, the countermeasure proposal creation unit 409 may increase the priority of the countermeasure proposal from the processor 304 lower in the utilization rate. Further, the countermeasure proposal creation unit 409 may calculate a predicted value combined with the processor utilization rate of the volume 108 added to the current utilization rate by change, and confirm whether the calculated predicted value is less than the reference value. When the predicted value exceeds the reference value, the countermeasure proposal creation unit 409 may delete, from the countermeasure proposal, the processor 304 whose predicted value exceeds the reference value.

In the case where the processor 304 that is less than the reference value is the processor 304 to which the other volume 108 of the same storage area group 107 is allocated in Step S902, the countermeasure proposal creation unit 409 searches for the processor 304 that is less than the reference value again (not shown). If there is only the processor 304 allocated to the other volume 108 of the same storage area group 107, the countermeasure proposal creation unit 409 confirms whether the utilization rate of the processor 304 exceeds the reference value even if the allocation to the processor 304 is changed. The countermeasure proposal creation unit 409 refers to the storage performance information management table 406, and reads the processor utilization rate of the problematic volume allocated to the processor 304 that is the bottleneck (S903).

The countermeasure proposal creation unit 409 calculates an average utilization rate of the processor 304 of a change destination candidate which is less than the reference value for a given period, and adds the calculated average utilization rate to the utilization rate read in Step S903. In that case, it is assumed that the performance of the processor 304 is the same between before and after the change. The countermeasure proposal creation unit 409 determines whether the total amount is less than the reference value (S904). If the determination result in Step S904 is less than the reference value, the countermeasure proposal creation unit 409 creates a description for changing the allocation to the processor 304 of the change destination candidate as a countermeasure proposal (S905).

If there is no processor 304 that is less them the reference value in Step S904, the countermeasure proposal creation unit 409 completes the processing with "no countermeasure" (S906). Similarly to the case of the port 109, if there is no corresponding processor in Step S901, it is meant that the load of each processor 304 is high, and the countermeasure proposal creation unit 409 completes the processing with "no countermeasure" (S906).

In the case where a write standby rate of the cache memory 305 used by the volume 108 is high and becomes the bottleneck, the countermeasure proposal refers to the write standby rate for each cache partition, and presents a countermeasure proposal to move the parity group 111 that is cutting out the problematic volume to a partition that is low in the standby rate and less than the reference value.

Next, processing in a case where it is determined that there is no bottleneck in a bottleneck analysis flow illustrated in FIG. 7 will be described. In the case where the performance of the IO number and the response time of the volume 108 in the storage area group 107 is not even and the bottleneck cannot be identified, in order to further distribute and equalize the load, the countermeasure proposal creation unit 409 presents the addition of the volume 108 as a countermeasure proposal.

FIG. 10 is a flowchart illustrating an example of a cutout proposal creation process of an additional volume. A volume to be added is set to be the same as the problematic volume with reference to the storage configuration information management table 405. Further, in order to further identify a required performance, the countermeasure proposal creation unit 409 reads access tendency information of the problematic volume so as to use the access tendency information of the volume 108 managed in the storage performance information management table 406 (S1001).

The access tendency of the volume 108 is classified according to a random access or a sequential access, or whether read (in) or write (out) is more. The storage information collection unit 402 collects the number of IO for each access tendency from the storage apparatus 103, and records the most frequent pattern by comparing the frequencies with each other in a collection period.

According to the access tendency, the volume 108 is managed with required performance levels in three stages of high, medium, and low. For example, the volume 108 is managed with a high performance when the random IO is high, a medium performance when there are more sequential reads, and a low performance when there are more sequential writes. Those performances may be defaulted by the management server 101 or may be set by an application administrator.

The countermeasure proposal creation unit 409 identifies a condition that the access tendency read in Step S1001 is satisfied as a required performance level (S1002). The countermeasure proposal creation unit 409 confirms whether the parity group 111 from which the problematic volume is cut coincides with the required performance level or is higher than the required performance level (S1003). When it is determined that the parity group 111 are coincident with or higher than the required performance level, the countermeasure proposal creation unit 409 creates cutting out from the parity group 111 having the same performance as that of the problematic volume as the countermeasure proposal (S1004).

In this example, when there is only one parity group 111 with the same performance, the countermeasure proposal creation unit 409 creates a proposal to cut out an additional volume from the same parity group 111 as the problematic volume. However, if there are a plurality of parity groups with the same performance, the countermeasure proposal creation unit 409 may create a proposal to cut out the additional volume from the parity group 111 different from the problematic volume so as not to concentrate a load on the parity group 111. When it is determined in Step S1003 that the performance is lower than the required performance, the countermeasure proposal creation unit 409 extracts the parity group 111 having the required performance level from the parity group 111 managed by the management server 101, and creates cutting out from the extracted parity group 111 as the countermeasure proposal (S1005).

The countermeasure proposal creation unit 409 may add, as a countermeasure proposal, to move all the data of the storage area group 107 to which the problematic volume belongs to the volume 108 of the parity group 111 with the required performance level. The countermeasure proposal creation unit 409 may add backup information as the countermeasure proposal. When the application has a backup function, the countermeasure proposal creation unit 409 may register the backup destination information in the AP configuration information management table 403, and create a countermeasure proposal including a backup destination path, capacity, and performance level so as to require the addition of the volume 108 having the same capacity and performance as those of the additional capacity to the backup destination according to the backup destination information to be managed. Furthermore, when relocation of the data is implemented after the volume 108 has been added, the countermeasure proposal creation unit 409 may extract a time zone with a small number of IO from past performance histories and add the relocation in the extracted time zone to the countermeasure proposal.

FIG. 11 is a diagram illustrating an example of the AP configuration information management table 403. In this example, the application program 106 manages information in the unit of a table space as a logical storage area for storing data, and an example in which the table space is allocated to the storage area group 107 will be described. The AP configuration information management table 403 includes a table space ID field 1101, a storage area group ID field 1102, a capacity field 1103, a volume ID field 1104, a backup destination field 1105, and a requested performance field 1106.

The table space name field 1101 is shown as an example, and is different depending on the type of the application program 106. As described above, the backup destination field 1105 has a backup function in the application and registers the backup function when the information is managed. The capacity field 1103 and the volume ID field 1104 configure a storage device forming each storage area group 107. The required performance field 1106 will be described in another embodiment.

FIG. 12 is a diagram illustrating an example of the storage configuration information management table 405. The storage configuration information management table 405 includes a volume ID field 1201 for uniquely identifying the volume 103 (logical unit 113), a volume capacity field 1202 for registering the capacity of the volume 108, a processor ID field 1203 for registering an identifier of the processor 304 to which the volume 108 is allocated, a port ID field 1204 for identifying the port 109 of the host I/F 302 used for access from the application server 102 to the volume 108, a parity group ID field 1205 for identifying the parity group 111 from which the volume 108 is cut out, and a cache ID field 1206 for identifying a cache partition allocated to the parity group 111 units.

In the storage apparatus 103, when a plurality of processors 304 are mounted on one blade and allocated to the volume 103 on the blade basis, an ID for identifying the processor blade (MPB 110) is registered in the processor ID field 1203. In the following description, any configuration of the single processor 304 and the processor blade may be applied unless the single processor 304 or the processor blade (MPB 110) is particularly distinctly described.

FIGS. 13A to 13D are diagrams illustrating examples of the storage performance information management table 406. The performance information on the storage apparatus 103 is periodically acquired from the storage apparatus 103 at preset predetermined time intervals, and recorded and managed in chronological order with the acquisition time. In FIGS. 13A to 13O, examples of values at one time are shown, and illustration of values at a plurality of times is omitted. The performance information includes the performance for each volume 108 illustrated in FIG. 13A, the performance for each processor 304 illustrated in FIG. 13B, the performance for each port 109 illustrated in FIG. 13C, and the performance for each cache partition illustrated in FIG. 13D.

The performance information for each volume 108 illustrated in FIG. 13A includes a volume ID field 1301, an average IO number field 1302, an average IO amount field 1303, an average response time field 1304, a processor utilization rate field 1305, and an access tendency field 1306. In the average IO number, an average value of a total number of the read IO number and the write IO number per predetermined time is recorded. Similarly, in the average response time, an average value of a total processing time taken for reading and writing per predetermined time is recorded. The average access tendency field 306 is not used in the present embodiment but used in another embodiment, and therefore will be described in another embodiment.

The performance information for each processor 304 illustrated in FIG. 13B includes a processor ID field 1311 and a utilization rate field 1312. The performance information for each port 109 illustrated in FIG. 13O includes a port ID field 1321, a communication traffic field 1322, and an IO number field 1323. The performance information for each cache partition illustrated in FIG. 13D includes a cache ID field 1331 and a write standby rate field 1332.

Figure 14:
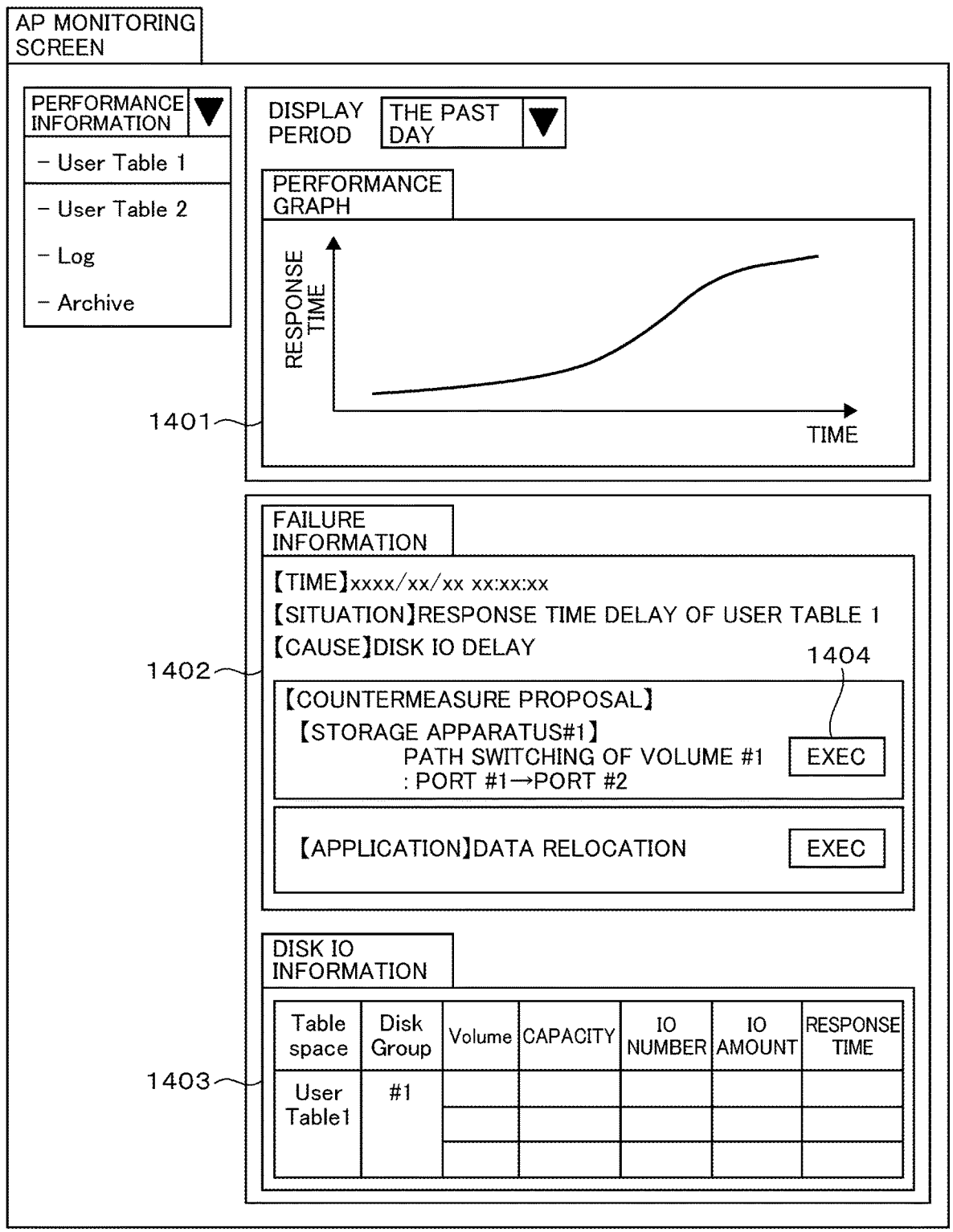
FIG. 14 A diagram, illustrating an example of a GUI screen for presenting a countermeasure proposal.

FIG. 14 is a diagram illustrating an example of a GUI screen for presenting a countermeasure proposal, FIG. 14 illustrates a performance monitoring screen used by the application administrator. As performance information, the UI 411 outputs a performance graph for each table space to an upper-stage 1401, outputs failure information to a middle stage 1402, and outputs information on the disk IO having a possibility of a cause to a lower stage 1403. The problem information output unit 410 outputs a character string created as a countermeasure proposal to a failure information column of the middle stage 1402.

The UI 411 may output an execution button (EXEC) 1404 and a script created as a countermeasure proposal may be executed by pressing the execution button 1404 by the application administrator. With the output of the UI 411, the application administrator can grasp a problem state in which the response time of the application is deteriorated, a situation on the related storage apparatus 103 side, and the countermeasure. It should be noted that the description created by the countermeasure preparation unit 409 may be simply output.

As described above, in an application system in which load distribution is performed by equally allocating data to the plurality of volumes 108, when a problem that the balance of the load distribution is uneven occurs, the monitoring of the balance and the countermeasure proposal in the storage apparatus 103 can be presented.

In addition, in the case of a system having a storage configuration automatic execution tool in addition to the screen output of the countermeasure proposal, the script of the countermeasure proposal may be input to the storage configuration automatic execution tool, to thereby automatically execute a change according to the countermeasure proposal within the storage apparatus 103. As a result, a workload of the application administrator can be reduced.

Second Embodiment

In the first embodiment, the example in which the logical volumes provided by the parity groups 111 are used has been described. On the other hand, in a second embodiment, an example in which a logical volume provided by a virtual volume attributable to thin provisioning that is one of the virtualization techniques in the storage device is used will be described. In the storage apparatus 103, a virtual volume whose storage capacity is virtualized is provided as a logical volume. In addition to a write access to a new area by an application program 106, storage areas are sequentially allocated from pools having actual storage areas to the virtual volume.

Each of the pools includes a plurality of pool volumes for each performance and characteristic such as the type of media and the number of revolutions of a disk. For that reason, as information to be managed, a pool ID field and a pool performance information field are added to the storage configuration information management table 405 illustrated in FIG. 12 of the first embodiment. As with the required performance level, the pool performance information is managed in three stages of high, middle, and low, and a storage area group 107 used by the application program 106 includes the volumes 108 using pools of the same performance. As in the first embodiment, a management server 101 monitors whether a response time and the number of IO of the volumes (logical volumes) 103 are equally balanced.

When the unevenness is detected, the management server manages the configuration information (ports, processors, caches allocation) and the performance information on the volume 108 even if the volumes 108 provided from the storage apparatus 103 is a virtual volume, analyzes a bottleneck in the storage apparatus 103, and presents countermeasure proposals. In the case of addition of the volumes 108 described with reference to FIG. 10, the management server determines a required performance level from an access tendency, and unlike the first embodiment, creates a countermeasure proposal for cutting out the volume 108 from the pool whose pool performance satisfies a condition.

Furthermore, the storage apparatus 103 may perform hierarchical management in which data is migrated to pool volumes different in performance, depending on an access frequency to the stored data, in addition to the thin provisioning. In such management, even if data is equally allocated from the application program 106 to the plurality of volumes 108, the data is migrated to different layers according to the data. As the additional storage configuration information, the hierarchical ratio of the volume 108 is managed. In the case where the ratio of the hierarchy configuring the volume 108 is made equal, the processing in the present embodiment is the same.

If the ratio of the hierarchy is not equal, there is a possibility that a variation in the response time becomes large among the volumes 108. For that reason, in a step of monitoring a load balance, the monitoring is performed by appropriately widely setting the reference value of the degree of deviation of the variation in the response time. For the volume 108 having a slow response time, a countermeasure proposal to change such that the ratio of the high performance hierarchy is increased is created.

As has been described above, even in the system using the virtual volumes attributable to the thin provisioning, the countermeasure proposal can be presented.

Third Embodiment

In the first embodiment, the performance of the storage apparatus 103 is monitored. On the other hand, in a third embodiment, an example will be described in which the performance on the side of an application server 102 is monitored, and when there is a delay in the response time viewed from the application server 102, a load of an access to a plurality of volumes 108 is analyzed. In other words, a difference from the first embodiment resides in that the monitoring and the problem detection are performed on an application basis.

A management server 101 collects the response times of IO from the application server 102 to the storage apparatus 103 before Step S502 of the first embodiment described with reference to FIG. 5. A step of determining whether the collected response time is not a reference value violation such as a threshold value or a baseline is added before Step S502. When it is determined that the response time violates, the management server 101 performs the processing in Step S502. Even if the balance of load distribution is uneven, if there is no problem with the response to the application server 102, there is no need to take any countermeasures, as a result of which a burden on the application administrator can be reduced.

Further, when a problem of the response delay occurs, the process returns to monitoring after Step S506 described with reference to FIG. 5, and the process is executed from Step S501, the management server 102 collects the response times in the application server 101 before processing Step S502. If it is determined that the collected response time has been recovered, there is no need to check whether the balance of the load distribution has improved, that is, no need to perform the processing in Step S502 onward. If it is determined that the response time has not been recovered, the management server 101 repeatedly executes the processing in Step S502 onward.

A step of comparing the response time collected from the application server 102 with the response time acquired from the storage apparatus 103 may be added subsequent to the process of collecting the response time before Step S502. When a difference between those two kinds of response times is larger than a preset reference value, it can be determined that there is a problem in the storage area network 104 between the application server 102 and the storage apparatus 103. As a result, even if the balance of the load distribution is uneven, it is found that a response delay to the application server 102 is a problem of the storage area network 104. As a result, there is no need to take countermeasures in the storage apparatus 103, and the burden on the application administrator can be reduced.

Fourth Embodiment

In the bottleneck analysis process described with reference to FIG. 7, when the bottleneck cannot be identified in the ports 109, the processor 304, and the cache memory 305, the example in which the volume 108 is added is described in the first embodiment. On the other hand, in a fourth embodiment, an example of creating a countermeasure proposal in which the volume 108 is not added but it is determined that the parity group 111 where the volumes 108 are disposed is a bottleneck and the volume 108 is migrated to another parity group 111 will be described. If the performance of each volume 108 in the storage area group 107 is not even and there is a problematic volume 108, the problematic volume 108 is migrated to another parity group 111.

Figure 15:
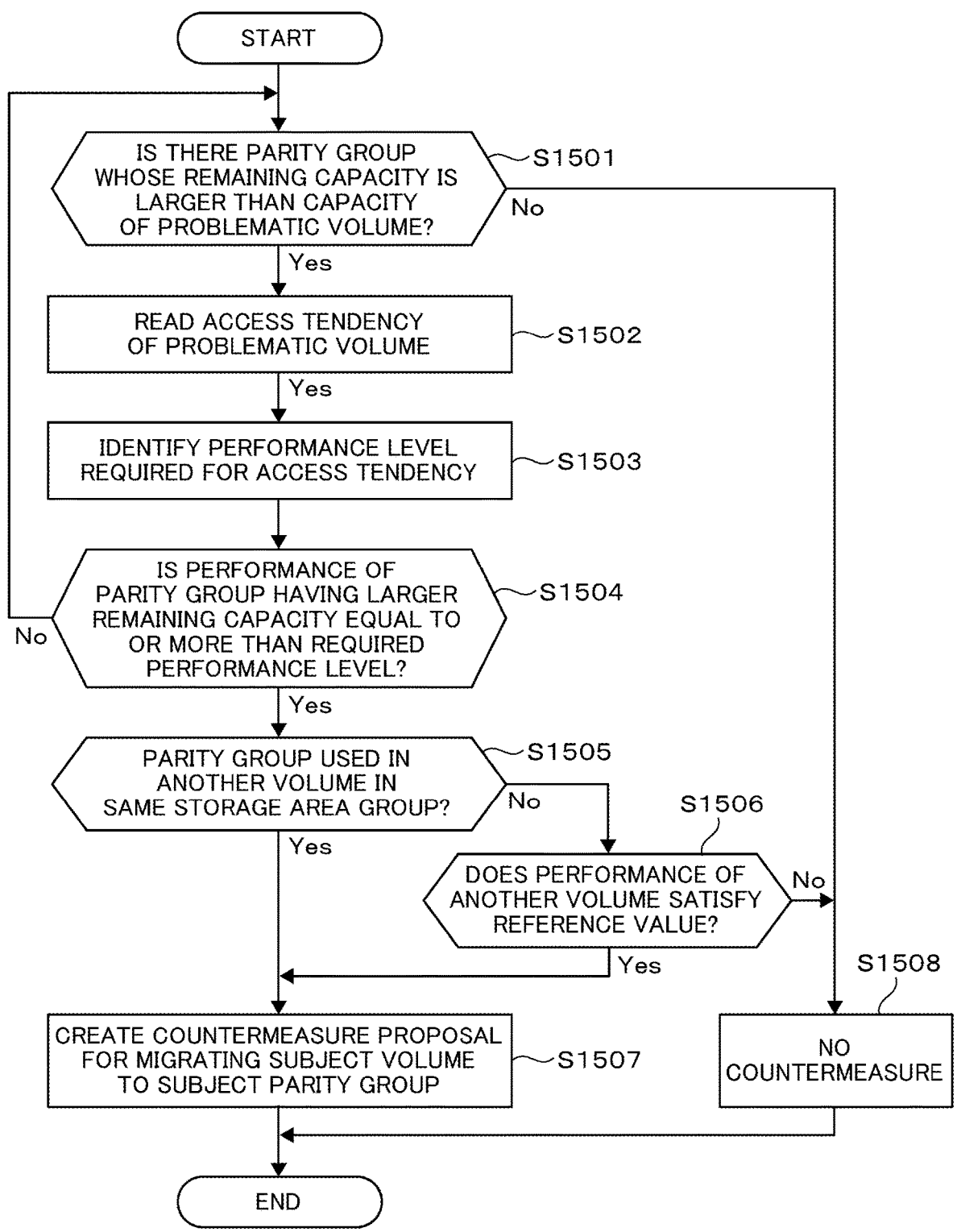
FIG. 15 A flowchart illustrating an example of a volume migration proposal creating process.

FIG. 15 is a flowchart illustrating an example of a migration proposal creation process of the volume 108. The countermeasure proposal creation unit 409 may perform processing according to a flowchart illustrated in FIG. 15 instead of the flowchart described with reference to FIG. 10. The countermeasure proposal creation unit 409 first searches for the parity group 111 whose remaining capacity is larger than a usable capacity of a problematic volume 108 (S1501). When it is determined that there is the parity group 111 with the larger remaining capacity, access tendency information of the volume 108 managed in the storage performance information management table 406 is used in order to identify the required performance as with the additional volume cutout process.

For that reason, the countermeasure proposal creation unit 409 reads the access tendency information of the problematic volume 108 (S1502). One of high, medium, and low is identified (S1503) with the condition that the read access tendency is satisfied as the required performance level. It is determined whether the parity group 111 having a larger remaining capacity extracted in Step S1501 coincides with the required performance level or is higher them the required performance level (S1504). If the result of the determination is less than the required performance level, the process returns to Step S1501 to extract another parity group 111 and repeat the processing.

If it is determined that there is no parity group 111 having the larger remaining capacity as the determination result in Step S1501, the countermeasure proposal creation unit 409 creates no countermeasure (S1508), Incidentally, in the case of executing Step S1508, the countermeasure proposal creation unit 409 may execute the cutout proposal creation process of the additional volume described with reference to FIG. 10, or may create a proposal for physically increasing the capacity of the parity group 111 in order to increase the remaining capacity.

If it is determined in Step S1504 that there is a parity group 111 with the required performance level, the countermeasure proposal creation unit 409 determines whether the parity group 111 with the required performance level is the parity group 111 used by another volume 108 in the same storage area group 107 as the problematic volume 108 (S1505). If it is determined that the result of this determination is not used, the countermeasure proposal creation unit 409 creates a countermeasure proposal for migrating the problematic volume 108 to the parity group 111 determined to have the required performance level in Step S1504 (S1507).

If it is determined in Step S1505 that another volume 108 is also used, the countermeasure proposal creation unit 409 acquires the IO performance of another volume 108 in a given period, which is determined to be in use, and determines whether the acquired IO performance satisfies the reference value (S1506). If it is determined that the result of this determination is satisfied, the countermeasure proposal creation unit 409 creates a countermeasure proposal for migrating the problematic volume 108 (S1507). The reference value in this example is a value for determining that there is no problem in performance, and the reference value is a preset value for the number of IO per unit time and the response time.

If it is determined in Step S1506 that the reference value is not satisfied, when the problematic volume 108 is migrated, the problematic volume 108 affects the performance of the other volume 108, and therefore the problematic volume 108 is not migrated. When there is no parity group 111 that satisfies the condition of Step S1506 as described above, the countermeasure proposal creation unit 409 creates no countermeasure (S1508).

As described above, the countermeasure proposal creation unit 409 can create a countermeasure proposal for migrating the problematic volume 108 to another parity group 111.

Fifth Embodiment

In the third embodiment, the example in which the performance as the application server 102 is monitored has been described. On the other hand, in a fifth embodiment, an example of monitoring whether an access performance of a storage area group 107 managed by an application program 106 in an application server 102 satisfies a required performance will be described. As already described with reference to FIG. 5, in Step S502, the management server 101 monitors whether a load balance of each volume 108 in the storage area group 107 is even. With the addition of another condition, if the access performance of the storage area group 107 does not satisfy the requirement, it is determined whether the load balance is even in Step S502.

As illustrated in FIG. 11, an AP configuration information management table 403 includes a requested performance field 1106, and stores and manages a required disk access performance value in the storage area group 107 (table space in an example in FIG. 11) which is the management unit of the application program 106. An index of that required performance is set to the number of IO per unit time in the example of FIG. 11. Alternatively, the index of the required performance may be the response time or the IO amount per unit time. The required performance value of the index is set by an application administrator in advance.

Figure 16:
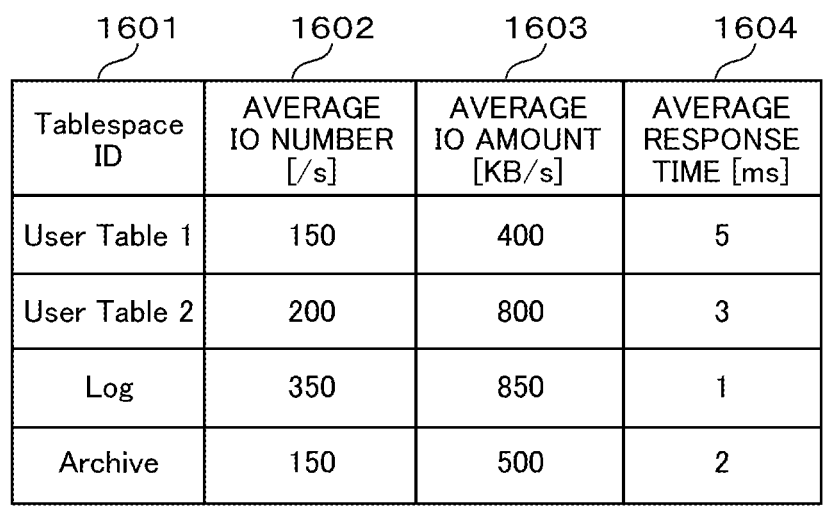
FIG. 16 A diagram illustrating an example of an AP performance information management table.

FIG. 16 is a diagram illustrating an example of an AP performance information management table 404 for managing the disk access performance information of the application. The AP performance information management table 404 is intended for managing the disk access performance information of the application program 106, and the performance information is periodically acquired from the application server 102, and the performance value in the unit period is recorded and managed in time series with an acquisition time.

In FIG. 16, an example of values at one time is shown, and illustration of values at a plurality of times is omitted. The AP performance information management table 404 includes an average IO number field 1602, an average IO amount field 1603, and an average response time field 1604 as the performance information for the value (ID) of the table space ID field 1601.

The management server 101 acquires the required performance value from the requested performance field 1106 of the AP configuration information management table 403 before Step S502 described with reference to FIG. 5, acquires the performance value from the average IO number field 1602 from the AP performance information management table 404, and determines whether the acquired performance value is equal to or higher than the acquired required performance value. If it is determined that the result of this determination is equal to or higher than the required performance value, that is, satisfies the required performance value, the process returns to Step S501 to continue monitoring. If it is determined that the result of this determination is lower than the required performance value, that is, does not satisfy the required performance value, the management server 101 proceeds to the processing in Step S502.

As has been described above, the required disk access performance for the application program 106 can be provided.

LIST OF REFERENCE SIGNS

101: management server, 102: application server, 103: storage apparatus, 106: application program, 107: storage area group, 108: volume, 109: port, 110: MPB, 111: parity group

The invention claimed is:

1. A management device that manages a storage apparatus having a plurality of logical storage areas to be accessed from a computer, comprising:
  a central processing unit (CPU), wherein the CPU:
  determines whether there is a setting that the computer equally accesses the plurality of logical storage areas, acquires the number of accesses to each of the plurality of logical storage areas if it is determined that there is the setting that the computer equally accesses, and determines whether there is a problematic logical storage area by comparing the acquired plural number of accesses with each other;
  acquires component information on the storage apparatus allocated to the problematic logical storage area if it is determined that there is the problematic logical storage area, and identifies which of components in the storage apparatus is a bottleneck based on the acquired component information;
  creates a countermeasure proposal that changes an access route passing through a configuration as the identified bottleneck based upon component information on the storage apparatus and the determination whether there is a problematic logical storage area; and
  outputs the created countermeasure proposal for implementation at the storage apparatus,
  wherein if it is determined that there is the setting to be equally accessed, the CPU acquires the number of accesses to each of the plurality of logical storage areas, calculates an average value of the acquired number of accesses in each of the plurality of logical storage areas in an arbitrary period, calculates an average value and a standard deviation of the calculated plurality of average values, and sets, as a problematic logical storage area, a logical storage area that does not fall within a preset first reference value of the calculated standard deviation from the calculated, average value of the plurality of average values,
  wherein the CPU acquires the number of accesses to a first port allocated to the problematic logical storage area among ports connected to the computer of the storage apparatus, determines whether the acquired number of accesses to the first port exceeds a preset second reference value, and identifies the first port as a bottleneck if it is determined that the acquired number of accesses to the first port exceeds the second reference value,
  the CPU acquires a utilization rate of a first processor allocated to the problematic logical storage area in processors of the storage apparatus, determines whether the acquired utilization rate of the first processor exceeds a preset third reference value, and identifies the first processor as the bottleneck if it is determined that the utilization rate exceeds the third reference value,
  the CPU acquires a hit rate of a first cache allocated to the problematic logical storage area among caches of the storage apparatus, determines whether the acquired hit rate of the first cache falls outside a range of a preset fourth reference value, and identifies the first cache as the bottleneck if it is determined that the acquired hit rate of the first cache falls outside the range of the fourth reference value,
  wherein the CPU determines whether a second port less than a preset fifth reference value is present in ports connected to the computer of the storage apparatus if the first port is identified as the bottleneck, and determines whether the second port is allocated to a plurality of logical storage areas determined to be equally accessed as the setting if it is determined that the second port is present,
  the CPU creates a countermeasure proposal for changing the first port to the second port if it is determined that the second port is not allocated to the plurality of logical storage areas determined to be equally accessed as the setting, and
  if it is determined that the second port is allocated to the plurality of logical storage areas determined to be equally accessed as the setting, the CPU calculates a first predicted value when the first port is changed to the second port, and creates a countermeasure proposal for changing the first port to the second port according to the calculated first predicted value.

2. The management device according to claim 1, wherein the CPU determines whether a second processor that is less than a preset sixth reference value is present in processors of the storage apparatus if the first processor is identified as the bottleneck, and determines whether the second processor is allocated to a plurality of logical storage areas determined to be equally accessed as the setting if the second processor is present, creates a countermeasure proposal for changing the first processor to the second processor if it is determined that the second processor is not allocated to the plurality of logical storage areas determined to be equally accessed as the setting, and calculates a second predicted value when the first processor is changed to the second processor if the second processor is determined to be allocated to the plurality of logical storage areas determined to be equally accessed as the setting, and creates a countermeasure proposal for changing the first processor to the second processor according to the calculated second predicted value.

3. The management device according to claim 2, wherein if none of the first port, the first processor, and the first cache is the bottleneck, the CPU creates a countermeasure proposal for adding a logical storage area to the plurality of logical storage areas determined to be equally accessed as the setting.

4. A management method for a management computer having a central processing unit (CPU), for managing a storage apparatus having a plurality of logical storage areas to be accessed from a computer, the management method comprising:

the CPU:
  determining whether there is a setting that the computer equally accesses the plurality of logical storage areas;
  acquiring the number of accesses to each of the plurality of logical storage areas if it is determined that there is the setting that the computer equally accesses;
  determining whether there is a problematic logical storage area by comparing the acquired plural number of accesses with each other;
  acquiring component information on the storage apparatus allocated to the problematic logical storage area if it is determined that there is the problematic logical storage area;
  identifying which of components in the storage apparatus is a bottleneck based on the acquired component information;
  creating a countermeasure proposal that changes an access route passing through a configuration as the identified bottleneck based upon component information on the storage apparatus and the determination whether there is a problematic logical storage area; and
  outputting the created countermeasure proposal for implementation at the storage apparatus, wherein if it is determined that there is the setting that the computer equally accesses, the CPU acquires the number of accesses to each of the plurality of logical storage areas, the CPU calculates an average value of the acquired number of accesses in each of the plurality of logical storage areas in an arbitrary period, and calculates an average value and a standard deviation of the calculated plurality of average values, the CPU sets a logical storage area that does not fall within a preset first reference value of the calculated standard deviation from the calculated average value of the plurality of average values as a problematic logical storage area, wherein the CPU acquires the number of accesses to a first port allocated to the problematic logical storage area among ports connected to the computer of the storage apparatus, the CPU determines whether the acquired number of accesses to the first port exceeds a preset second reference value, the CPU identifies the first port as the bottleneck if it is determined that the acquired number of accesses to the first port exceeds the second reference value, the CPU acquires a utilization rate of a first processor allocated to the problematic logical storage area in processors of the storage apparatus, the CPU determines whether the acquired utilization rate of the first processor exceeds a preset third reference value, and identifies the first processor as the bottleneck if it is determined that the utilization rate exceeds the third reference value, the CPU acquires a hit rate of a first cache allocated to the problematic logical storage area among caches of the storage apparatus, the CPU determines whether the acquired hit rate of the first cache falls outside a range of a preset fourth reference value, and identifies the first cache as the bottleneck if it is determined that the acquired hit rate of the first cache falls outside the range of the fourth reference value, wherein the CPU determines whether a second port that is less than a preset fifth reference value is present in ports connected to the computer of the storage apparatus if the first port is identified as the bottleneck, the CPU determines whether the second port is allocated to a plurality of logical storage areas determined as the setting to be equally accessed if it is determined that the second port is present, the CPU creates a countermeasure proposal for changing the first port to the second port if it is determined that the second port is not allocated to the plurality of logical storage areas determined to be equally accessed as the setting, and if it is determined that the second port is allocated to the plurality of logical storage areas determined to be equally accessed as the setting, the CPU calculates a first predicted value when the first port is changed to the second port, and creates a countermeasure proposal for changing the first port to the second port according to the calculated first predicted value.

5. The management method according to claim 4, wherein the CPU determines whether a second processor that is less than a preset sixth reference value is present in processors of the storage apparatus if the first processor is identified as the bottleneck, the CPU determines whether the second processor is allocated to a plurality of logical storage areas determined to be equally accessed as the setting if the second processor is present, the CPU creates a countermeasure proposal for changing the first processor to the second processor if it is determined that the second processor is not allocated to the plurality of logical storage areas determined to be equally accessed as the setting, and the CPU calculates a second predicted value when the first processor is changed to the second processor if the second processor is determined to be allocated to the plurality of logical storage areas determined to be equally accessed as the setting, and creates a countermeasure proposal for changing the first processor to the second processor according to the calculated second predicted value.

6. The management method according to claim 5,
wherein if none of the first port, the first processor, and the first cache is the bottleneck, the CPU creates a countermeasure proposal for adding a logical storage area to the plurality of logical storage areas determined to be equally accessed as the setting.

\* \* \* \* \*